(12) United States Patent
Mujtaba et al.

(10) Patent No.: US 7,809,046 B2
(45) Date of Patent: Oct. 5, 2010

(54) TIMING-OFFSET ESTIMATION IN MODULATED SIGNALS USING WEIGHTED CORRELATION VALUES

(75) Inventors: Syed Mujtaba, Watchung, NJ (US); Xiaowen Wang, Bridgewater, NJ (US)

(73) Assignee: Agere Systems Inc., Allentown, PA (US)

( * ) Notice: Subject to any disclaimer, the term of this patent is extended or adjusted under 35 U.S.C. 154(b) by 539 days.

(21) Appl. No.: 11/866,812

(22) Filed: Oct. 3, 2007

(65) Prior Publication Data

US 2009/0092038 A1 Apr. 9, 2009

(51) Int. Cl.
*H04L 27/30* (2006.01)

(52) U.S. Cl. .................. 375/145; 375/149; 375/150; 375/362; 370/510

(58) Field of Classification Search .......... 375/145, 375/149, 150, 152, 343, 354, 362; 370/503, 370/509–511
See application file for complete search history.

(56) References Cited

U.S. PATENT DOCUMENTS

| 7,623,582 | B2 * | 11/2009 | Kim et al. | 375/260 |
| 2007/0268974 | A1 * | 11/2007 | Chun et al. | 375/260 |
| 2007/0291696 | A1 * | 12/2007 | Zhang et al. | 370/331 |
| 2008/0240307 | A1 * | 10/2008 | Wang et al. | 375/343 |

OTHER PUBLICATIONS

Dongkoon Lee and Kyungwhoon Cheun, "Coarse Symbol Synchronization Algorithms For OFDM Systems In Multipath Channels," IEEE Communications Letters, Oct. 2002, pp. 446-448, vol. 6, No. 10.

Tiejun LV, Hua Li, and Jie Chen, "Joint Estimation Of Symbol Timing and Carrier Frequency Offset Of OFDM Signals Over Fast Time-Varying Multipath Channels," IEEE Transactions On Signal Processing, Dec. 2005, pp. 4526-4535, vol. 53, No. 12.

\* cited by examiner

*Primary Examiner*—Dac V Ha
(74) *Attorney, Agent, or Firm*—Mendelsohn, Drucker & Associates, P.C.; Craig M. Brown; Steve Mendelsohn

(57) ABSTRACT

In one embodiment, a timing-offset estimator calculates a correlation value for each sample of an OFDM signal having a cyclic prefix for each OFDM symbol. The correlation value is provided to a tapped delay line that applies a separate weight to each of 2V correlation values, where V is the length of the cyclic prefix and the weights are based on a triangular weighting scheme that increases linearly from the first value, peaks at the $V^{th}$ value, and decreases linearly to the $2V^{th}$ value. A stream of combined, squared correlation values is generated by combining and squaring the 2V weighted correlation values for each sample of the OFDM signal. For each cyclic prefix of the OFDM signal, a timing-offset estimate is determined based on a detected peak value in the stream of combined, squared correlation values. A timing-offset estimator with triangular weighting scheme may be implemented using recursive processing.

17 Claims, 10 Drawing Sheets

TIMING-OFFSET ESTIMATION IN MODULATED SIGNALS USING WEIGHTED CORRELATION VALUES

BACKGROUND OF THE INVENTION

1. Field of the Invention

The present invention relates to signal processing, and more specifically, to modulation techniques, such as orthogonal frequency division multiplexing, used in signal transmission and reception.

2. Description of the Related Art

Orthogonal frequency division multiplexing (OFDM) is a signal processing technology well known in the field of communications. In general, OFDM operates by dividing a frequency spectrum into smaller frequency subcarriers (a.k.a., tones) and modulating the subcarriers with parts of a data signal.

FIG. 1 shows a simplified block diagram of one implementation of a prior-art OFDM transmitter 100. Transmitter 100 has data symbol mapper 102, which receives a serial bitstream of digital data from upstream processing. The serial bitstream is divided into groups of bits, and each group is mapped into one or more data symbols to generate a serial stream of data symbols. Mapping may be performed using one or more suitable techniques such as quadrature phase-shift-keying (QPSK) and quadrature amplitude modulation (QAM).

Serial-to-parallel (S/P) converter 103 converts the serial stream of data symbols received from data symbol mapper 102 into D parallel streams of data symbols. Subcarrier mapper 104 assigns the D parallel data symbol streams to N subcarrier frequencies (i.e., tones), where the N subcarrier frequencies are arranged orthogonally to one another. In particular, each parallel data symbol stream is assigned to a separate output of subcarrier mapper 104, where each output corresponds to a different one of the N subcarriers. Note that, according to various implementations, a number D of data symbols and a number P of pilot symbols may be assigned to the N subcarriers, where there may be a number U of unused (i.e., free) subcarriers, such that N=D+P+U. The N outputs of subcarrier mapper 104 (i.e., $Z=Z_1, \ldots, Z_N$) are then provided to inverse fast Fourier transform (IFFT) processor 106. IFFT processor 106 transforms each set of N outputs from subcarrier mapper 104 into one OFDM symbol, comprising N time-domain samples (e.g., $z=z_1, \ldots, z_N$).

After IFFT processing 106, cyclic-prefix inserter (CPI) 108 inserts a cyclic prefix onto each OFDM symbol. A cyclic prefix, which is typically a copy of the last V samples of an OFDM symbol, enables the receiver to establish the timing of the OFDM symbol. Each OFDM symbol and each corresponding cyclic prefix are converted from parallel to serial format by parallel-to-serial (P/S) converter 110. The output of P/S converter 110 may be further processed using digital-to-analog (D/A) conversion, radio-frequency (RF) modulation, amplification, or other processing suitable for preparing an OFDM signal, comprising one or more OFDM symbols, for transmission.

FIG. 2 shows a simplified representation of one implementation of a prior-art OFDM signal 200 transmitted over a single-path channel (e.g., such as an additive white Gaussian noise (AWGN) channel). OFDM signal 200 comprises multiple OFDM symbols, including OFDM symbol 1 and OFDM symbol 2, where each OFDM symbol comprises N samples. A cyclic prefix is appended to the beginning of each OFDM symbol, where the cyclic prefix represents a copy of the last V samples of the corresponding OFDM symbol. For example, cyclic prefix 1, appended to OFDM symbol 1, is a copy of the last V samples of OFDM symbol 1 and cyclic prefix 2, appended to OFDM symbol 2, is a copy of the last V samples of OFDM symbol 2.

SUMMARY OF THE INVENTION

In one embodiment, the present invention is a method for processing a multi-carrier modulated signal having a cyclic prefix. The method comprises generating correlation values for the multi-carrier modulated signal. A set of weights is applied to each of a plurality of sets of the correlation values to generate a plurality of sets of weighted correlation values. The weights in a first subset of the set of weights ascend linearly from a first minimum value to a peak value, and the weights in a second subset of the set of weights descend linearly from the peak value to a second minimum. The weighted correlation values in each set of weighted correlation values are combined to generate a combined correlation value in a stream of combined correlation values. A peak value is identified based on the stream of combined correlation values, and a timing-offset estimate corresponding to the cyclic prefix is generated based on the identified peak value.

In another embodiment, the present invention is an apparatus comprising a timing-offset estimator adapted to implement the method described above.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
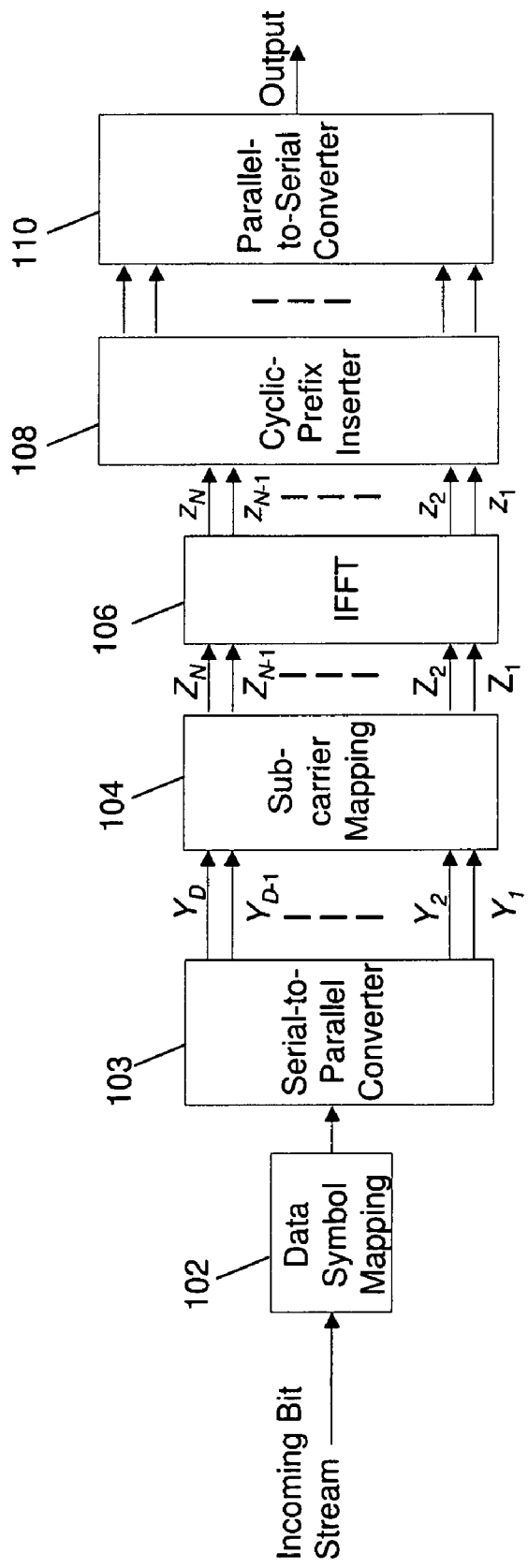
FIG. 1 shows a simplified block diagram of one implementation of a prior-art OFDM transmitter.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

When an orthogonal frequency division multiplexed (OFDM) signal is received, the receiver typically does not know a priori the boundaries of each OFDM symbol. However, the boundaries for each OFDM symbol can be estimated based on the correlation properties of the OFDM signal. Consider OFDM signal 200 of FIG. 2. Each sample of cyclic prefix 1 is correlated with a sample that is received N samples later (i.e., within the last V samples of OFDM symbol 1) since cyclic prefix 1 is a copy of the last V samples. On the other hand, each sample of OFDM symbol 1 typically varies in relation to a sample that is received N samples later (i.e., a sample of cyclic prefix 2 or OFDM symbol 2), and thus, the two samples have little or no correlation.

Figure 2:
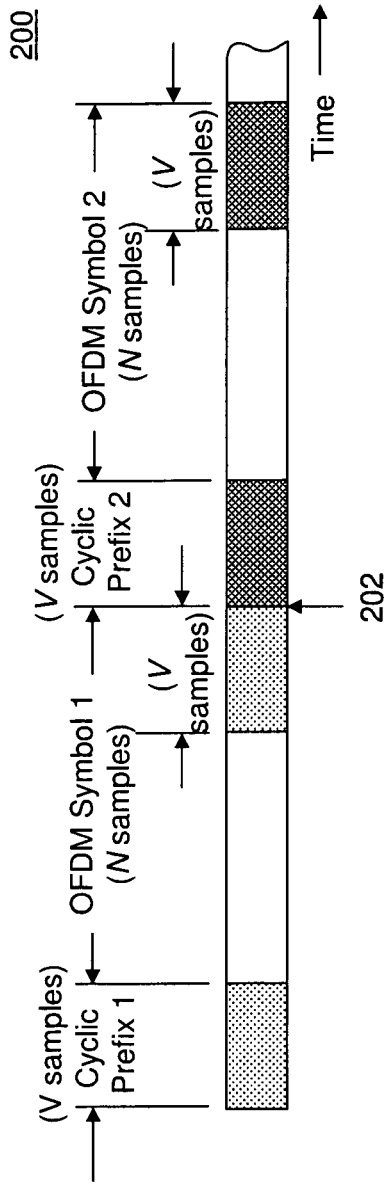
FIG. 2 shows a simplified representation of one implementation of a prior-art OFDM signal transmitted over a single-path channel.
Figure 3:
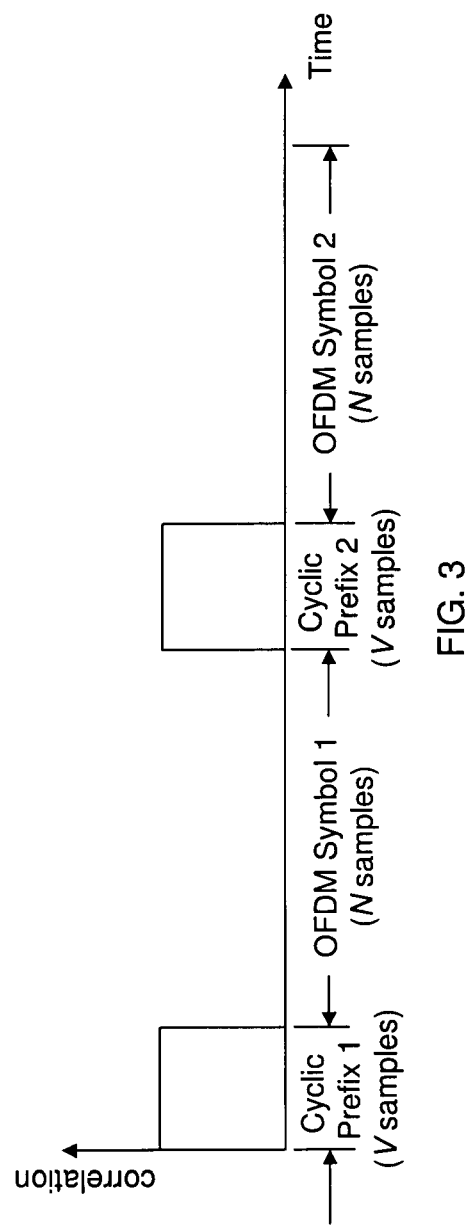
FIG. 3 graphically illustrates the correlation versus sample characteristics of the OFDM signal of FIG. 2.

FIG. 3 graphically illustrates the correlation versus sample characteristics of OFDM signal 200 of FIG. 2. As shown, the correlation is highest for the samples of cyclic prefix 1 and 2 and is also relatively constant for these samples. After each cyclic prefix, the correlation decreases and remains relatively low for each sample of OFDM symbols 1 and 2. Based on the correlation characteristics shown in FIG. 3, the receiver may estimate the location of the first sample of each cyclic prefix.

Figure 4:
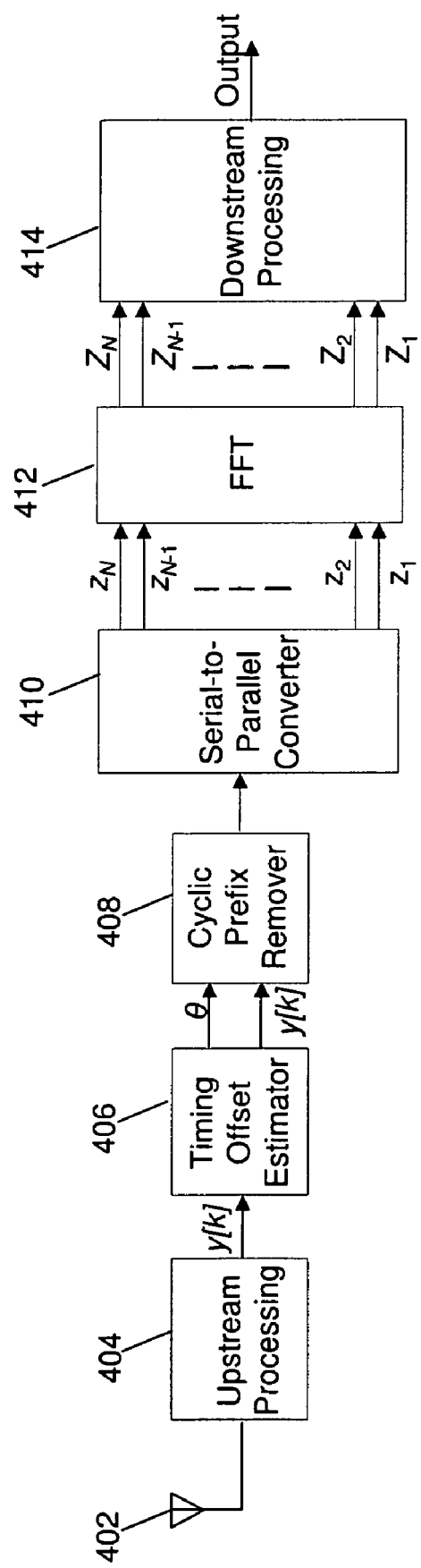
FIG. 4 shows a simplified block diagram of one implementation of an OFDM receiver.

FIG. 4 shows a simplified block diagram of one implementation of an OFDM receiver 400. Receiver 400 receives an OFDM signal y[k] via antenna 402 and pre-processes the OFDM signal y[k] using upstream processing 404, which might include analog-to-digital (A/D) conversion, RF demodulation, or other processing suitable for preparing OFDM signal y[k] for timing estimation. Timing-offset estimator 406 estimates the location of the first sample of each cyclic prefix of OFDM signal y[k], as described in further detail below, and provides a separate timing-offset estimate θ for each cyclic prefix to cyclic-prefix remover (CPR) 408. Cyclic-prefix remover (CPR) 408 removes V samples (preferably the V samples of the cyclic prefix) from the beginning of each OFDM symbol based on a timing-offset estimate θ and provides the next N samples (preferably the N samples of the OFDM symbol) to serial-to-parallel (S/P) converter 410.

S/P converter 410 converts each set of N samples from serial-to-parallel format. Specifically, each set of N samples is assigned to N parallel outputs, such that each sample is assigned to a different output. Each set of N parallel samples (i.e., $z=z_1, \ldots, z_N$) is provided to fast Fourier transform (FFT) processor 412, which transforms each set from the time-domain into a set of N frequency-domain samples (i.e., $Z=Z_1, \ldots Z_N$). Then, each set of N frequency-domain samples is provided to downstream processing 414, which performs processing suitable for recovering the originally transmitted bitstream, such as equalization and data symbol demapping.

Figure 5:
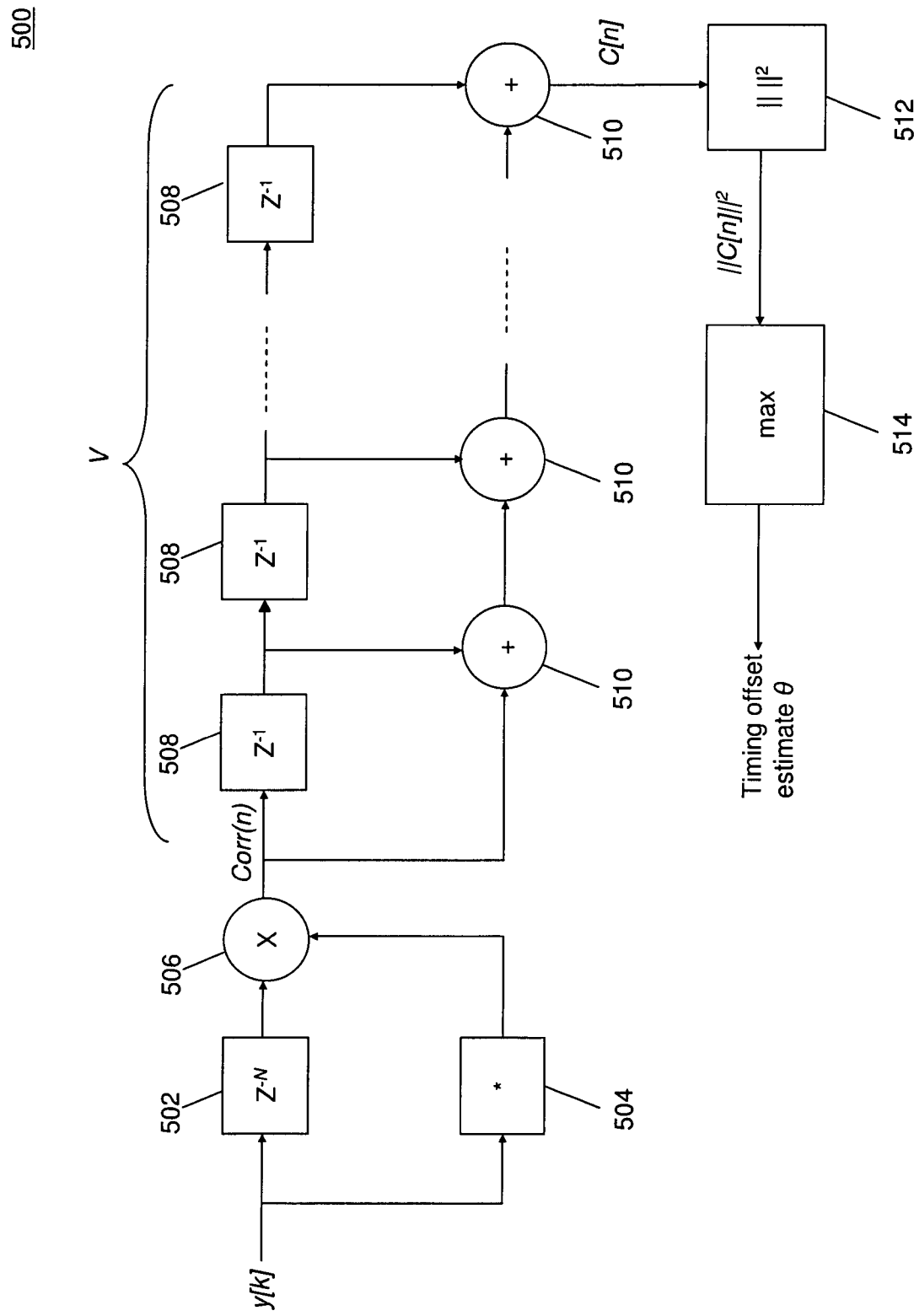
FIG. 5 shows a simplified block diagram of one implementation of a timing-offset estimator that may be used to implement the timing-offset estimator of the receiver of FIG. 4.

FIG. 5 shows a simplified block diagram of one implementation of a timing-offset estimator 500 that may be used to implement timing-offset estimator 406 of receiver 400. Timing-offset estimator 500 has delay element 502, complex conjugate operator 504, and multiplier 506, which together may be considered to be a correlator, and which together generate a correlation value for each received sample. In particular, delay element 502 receives OFDM signal y[k] and delays each sample of OFDM signal y[k] by N samples. Complex conjugate operator 504 also receives OFDM signal y[k] and calculates a complex conjugate value for each sample of OFDM signal y[k]. Multiplier 506 multiplies each complex conjugate value by a sample of OFDM signal y[k] that has been delayed by N samples to generate an individual correlation value corr(n). Each individual correlation value corr(n) is then provided to a tapped-delay line, comprising V−1 one-sample delay elements 508 and V−1 adders 510.

During each iteration, the tapped-delay line processes V individual correlation values corr(n). Specifically, the most recently received individual correlation value corr(n) is provided to the first delay element 508 and the first adder 510 of the tapped-delay line. Each delay element 508, including the last, provides a delayed individual correlation value corr(n) to an adder 510, such that the first delay element 508 provides a first delayed individual correlation value corr(n) to the first adder 510. Additionally, each delay element 508, except for the last, provides the corresponding delayed individual correlation value corr(n) to a subsequent delay element 508. The first adder 510 combines the most recently received individual correlation value corr(n) and the first delayed individual correlation value corr(n), and provides the sum to the second adder 510. Each subsequent adder 510, except for the last, receives a sum from the previous adder, combines the sum with a delayed individual correlation value corr(n), and provides a new sum to the next adder 510. The last adder 510 combines the sum from the previous adder 510 and a delayed individual correlation value corr(n), and outputs a combined correlation value C[n], where n is the time index. Square calculator 512 receives each combined correlation value C[n] and calculates the square of the value to generate a squared combined correlation value $\|C[n]\|^2$. Max operator 514 determines the peak (i.e., maximum) squared combined correlation value $\|C[n]\|^2$ corresponding to each cyclic prefix, and outputs a timing-offset estimate θ for each cyclic prefix based on the peak value. Max operator 514 is performed on the squared combined correlation values $\|C[n]\|^2$ instead of the combined correlation values C[n] in order to alleviate the effects of possible frequency offsets. Note that, the use of square calculator 512 is optional and a timing-offset estimate θ may be determined for each cyclic prefix based on the peak value of the combined correlation values C[n].

Once a timing-offset estimate has been generated, the V cyclic prefix samples are removed by CPR 408 of FIG. 4 to position the N samples of the OFDM symbol for fast Fourier transform (FFT) processing. If a timing-offset estimate θ accurately estimates the location of the first sample of a cyclic prefix, then the N samples of the corresponding OFDM symbol will be aligned properly for FFT processing. However, if the timing-offset estimate θ does not accurately estimate the location of the first sample of the cyclic prefix, then the N samples of the OFDM symbol will not be aligned properly for FFT processing. For example, consider OFDM signal 200 of FIG. 2, where timing-offset estimate 202 is shown at the beginning of cyclic prefix 2. Based on timing-offset estimate 202, the V samples removed by CPR 408 will consist of the V samples of cyclic prefix 2. The next N samples that are provided to S/P converter 410, and subsequently to FFT processor 412, will consist of the N samples of OFDM symbol 2.

If an error arises and timing-offset estimate 202 is shifted slightly to the left, then the V samples removed by CPR 408 will consist of one or more samples of OFDM symbol 1 and some but not all of the samples of cyclic prefix 2. The next N samples that are provided to S/P converter 410, and subsequently to FFT processor 412, consist of one or more samples at the end of cyclic prefix 2 and some, but not all, of the samples of OFDM symbol 2. The one or more samples at the end of cyclic prefix 2 are copies of the one or more samples of OFDM symbol 2 that are not provided to S/P converter 410. Thus, although OFDM symbol 2 is not aligned optimally for FFT processor 412, no data will be lost. FFT processor 412 transforms the N time-domain samples, and outputs N frequency-domain samples that are phase shifted due to the misalignment of the N time-domain samples. The N frequency-domain samples may then be phase shifted by downstream processing 414 to aid in the recovery of the originally transmitted data.

If an error arises in generating timing-offset estimate 202 such that estimate 202 is shifted slightly to the right, then the V samples removed by CPR 408 will consist of some but not all of the samples of cyclic prefix 2 and one or more samples of OFDM symbol 2. Since some of the samples of OFDM symbol 2 are removed by CPR 408, the next N samples that are provided to S/P converter 410, and subsequently to FFT processor 412, will consist of some but not all of the N samples of OFDM symbol 2. As a result, some or all of the originally transmitted data may be lost.

In wireless communication systems, a transmitted OFDM signal may travel over a multiple-path channel to a receiver. Each path carries a version of the OFDM signal that is altered due to factors such as the length of the path, the number of reflections in the path, and the particular reflective objects in the path. These factors may vary from one path to the next, and as a result, each version of the OFDM signal may arrive at the receiver with a delay and a signal gain and a phase shift that are different from those of the other versions. The version that travels over the most direct path generally arrives at the receiver with the shortest delay and the largest signal amplitude. Note, however, that due to the varying nature of channel characteristics this might not always be the case. As subsequent versions (i.e., versions after the first) arrive at the receiver, the subsequent versions are superimposed onto the first version creating a composite OFDM signal that is received by the receiver.

Figure 6:
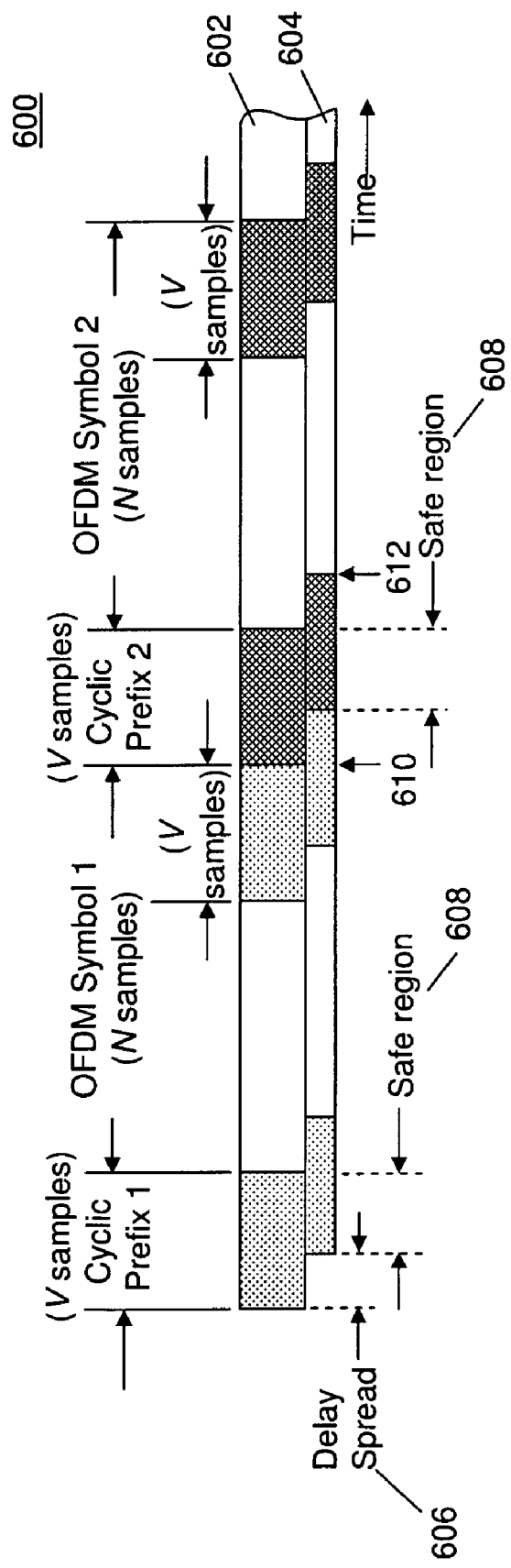
FIG. 6 shows a simplified representation of one implementation of a composite OFDM signal received over a multi-path channel.

FIG. 6 shows a simplified representation of one implementation of a composite OFDM signal 600 received over a multi-path channel. Composite OFDM signal 600 comprises a first version 602 of a transmitted OFDM signal, received over a first path, and a second version 604 of the same transmitted OFDM signal, received over a second path. First version 602 has a larger signal amplitude than that of second version 604, as illustrated by the heights of the two versions. Additionally, first version 602 has a smaller delay than second version 604, resulting in delay spread 606. Note that, in typical multi-path transmissions, a composite OFDM signal will comprise more than two versions, in which case, the delay spread is the difference between the delays of the first and last versions.

Each cyclic prefix of composite OFDM signal 600 has a safe region (e.g., safe region 608). If fast Fourier transform (FFT) processing at the receiver is performed on N samples beginning in a safe region, then the likelihood of inter-symbol interference (i.e., interference with the previous or subsequent OFDM symbol) is reduced. However, if FFT processing is performed on N samples beginning before or after a safe region, then the likelihood of inter-symbol interference is increased. For example, if FFT processing is performed on N samples beginning at time 610, then the end of OFDM symbol 1 of second version 604 will interfere with the decoding of OFDM symbol 2. If FFT processing is performed on N samples beginning at time 612, then the beginning of the subsequent OFDM symbol (e.g., OFDM symbol 3) of first version 602 will interfere with the decoding of OFDM symbol 2. Note that, the interference that occurs as a result of starting FFT processing prior to safe region 608 is less than the interference that occurs as a result of starting FFT processing after safe region 608 because the subsequent OFDM symbol of first version 602 has a greater amplitude than that of OFDM symbol 1 of second version 604. A timing-offset estimate θ is preferably chosen such that, after removal of V samples by a cyclic prefix remover (CPR), FFT processing is performed on N samples beginning with a sample within the safe region.

Timing-offset estimator 500 of FIG. 5 may be used in multiple-path applications to generate a timing-offset estimate θ for each cyclic prefix of a received composite OFDM signal based on the correlation properties of the received signal. Note, however, that the correlation properties of a composite OFDM signal are different from that of a single-path OFDM signal due to the delay spread of the composite OFDM signal. For example, OFDM signal 200 of FIG. 2 has V samples corresponding to each cyclic prefix that are correlated with the end of the corresponding OFDM symbol. Composite OFDM signal 600, on the other hand, has more than V samples corresponding to each cyclic prefix (e.g., from time 610 to time 612) that are correlated with the end of the corresponding OFDM symbol. As delay spread 606 increases, the number of correlated samples also increases (e.g., time 610 to time 612 increases). As the number of correlated samples of a composite OFDM signal increases over that of a comparable single-path OFDM signal, the location of the timing-offset estimates θ generated by timing-offset estimator 500 generally changes as illustrated in FIG. 7.

Figure 7:
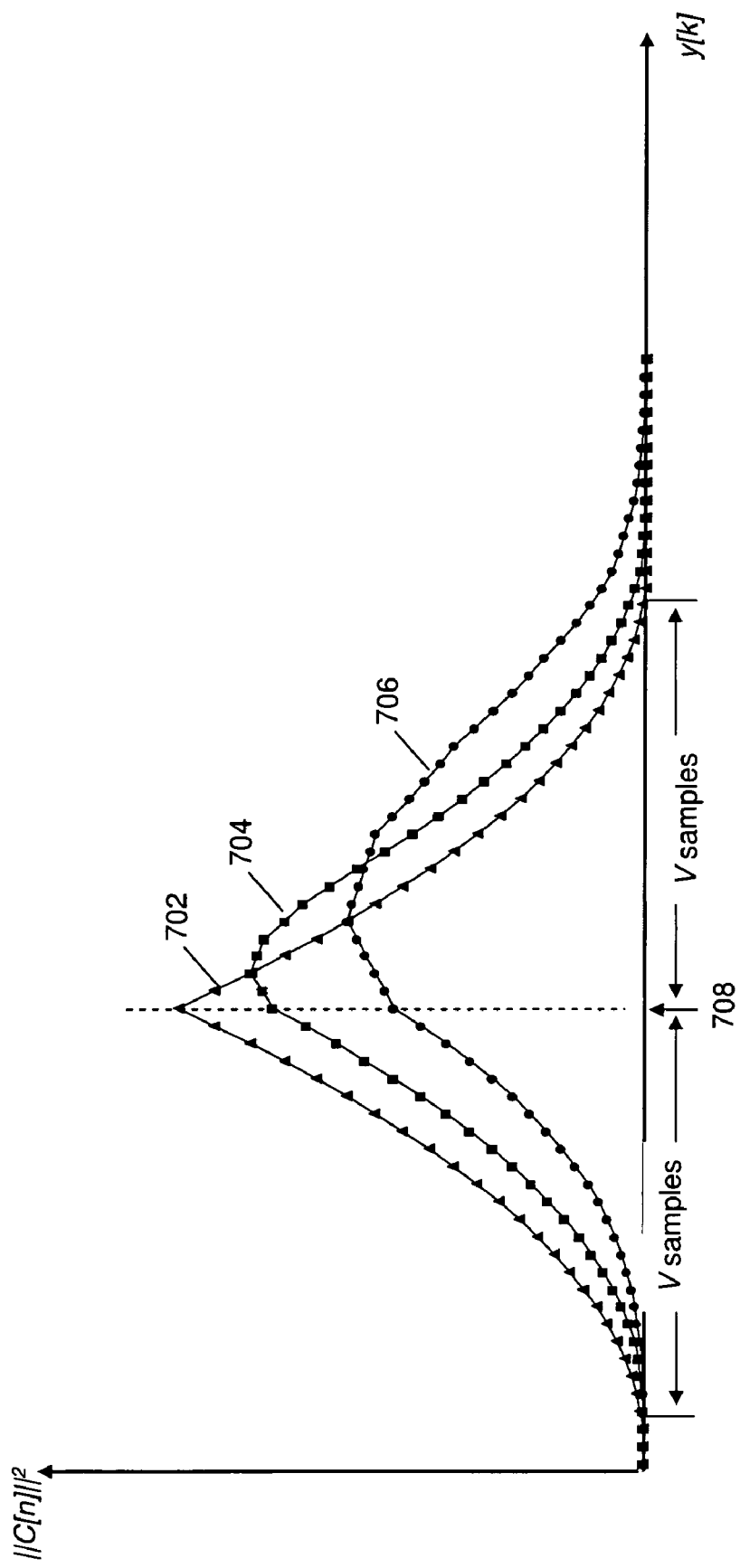
FIG. 7 graphically illustrates the output of the square calculator of the timing-offset estimator of FIG. 5 versus time for three hypothetical OFDM signals.

FIG. 7 graphically illustrates three outputs (i.e., $\|C[N]\|^2$) of square calculator 512 of timing-offset estimator 500 of FIG. 5 versus time for three hypothetical OFDM signals. The particular length of time shown in FIG. 7 is just longer then twice the length of one cyclic prefix (i.e., >2V samples). Curve 702 represents the output of square calculator 512 for a hypothetical single-path OFDM signal. As shown, curve 702 peaks at the beginning of a cyclic prefix (e.g., time 708), and thus, the timing-offset estimate θ, which corresponds to the peak value, will also correspond to the beginning of the cyclic prefix.

Curve 704 represents the output of square calculator 512 for a hypothetical first composite OFDM signal. The first composite OFDM signal is comparable to the single-path OFDM signal described in the previous paragraph (e.g., cyclic prefixes are the same and OFDM symbols are the same), and is generated based on a plurality of received versions of an OFDM signal, wherein the delay spread of the received versions is relatively small (i.e., the length of the delay spread is small compared to the length of the cyclic prefix). Due to the delay spread, the peak of curve 704 generated by timing-offset estimator 500 is lower and shifted further in time than the peak of curve 702.

Curve 706 represents the output of square calculator 512 for a hypothetical second composite OFDM signal. The second composite OFDM signal is comparable to the single-path OFDM signal and the first composite OFDM signal discussed above, and, similar to the first composite OFDM signal, is generated based on a plurality of received versions of an original OFDM signal. The delay spread of the second composite OFDM signal is longer than that of the first composite OFDM signal but less than the length of the cyclic prefix (i.e., less than V samples). Due to the longer delay spread, the peak of curve 706 generated by timing-offset estimator 500 is lower and shifted further in time than the peak of curve 704.

The three curves of FIG. 7 illustrate a general trend for timing-offset estimates θ generated by timing-offset estimator 500 for received OFDM signals. As the delay spread of a received OFDM signal increases, the peak value of output of square calculator 512 flattens and is shifted further in time. As the output of square calculator 512 flattens, the peak value becomes more difficult to ascertain, resulting in errors in determining timing-offset estimates θ. Additionally, as the peak value, and consequently the timing-offset estimate θ, is shifted further in time, the location in which FFT processing is started is shifted further in time. This shifting of the timing-offset estimate θ can result in the FFT processing being performed on N samples beginning after the safe region, increasing the likelihood of inter-symbol interference with the subsequent OFDM symbol and the possible effects of the interference. To compensate for the flattening and shifting of the peak value, a timing-offset estimator can be envisioned that applies weighting coefficients to the correlation values before combining them.

Figure 8:
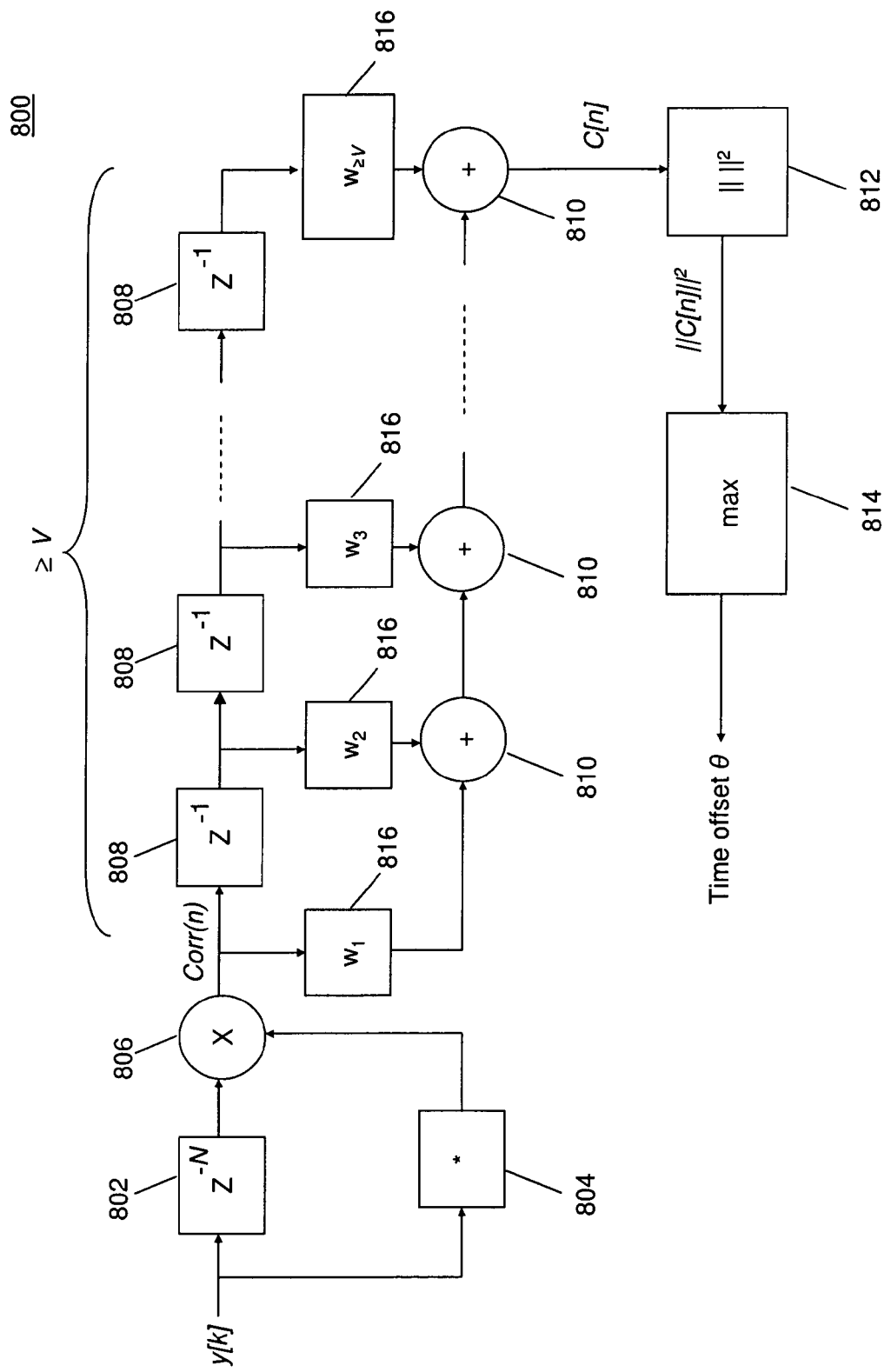
FIG. 8 shows a simplified block diagram of a timing-offset estimator according to one embodiment of the present invention.

FIG. 8 shows a simplified block diagram of a timing-offset estimator 800 according to one embodiment of the present invention. Timing-offset estimator 800 has delay element 802, complex conjugate operator 804, and multiplier 806, which together may be considered to be a correlator, and which perform operations analogous to those of the equivalent processing of timing-offset estimator 500 of FIG. 5 to generate an individual correlation value corr(n) for each received sample. Each individual correlation value corr(n) is then provided to a tapped-delay line, comprising ≥V-1 single-sample delay elements 808, ≥V weighting coefficient multipliers 816, and ≥V-1 adders 810.

During each iteration, the tapped-delay line processes a number of individual correlation values corr(n) greater than or equal to the cyclic prefix length (i.e., ≥V samples). Specifically, the most recently received individual correlation value corr(n) is provided to the first delay element 808 and the first weighting coefficient multiplier 816. Each delay element 808, except for the last, provides a delayed individual correlation value corr(n) to a subsequent delay element 808. Additionally, each delay element 808, including the last, provides a delayed individual correlation value corr(n) to a weighting coefficient multiplier 816, such that the first delay element 808 provides its delayed individual correlation value corr(n) to the second weighting coefficient multiplier 816 and the subsequent delay elements 808 provide their delayed individual correlation values corr(n) to separate subsequent weighting coefficient multipliers 816. Each weighting coefficient multiplier 816 multiplies its received individual correlation value corr(n) by a coefficient (e.g., $w_1, w_2, \ldots, w_{\geq V}$) and provides a weighted correlation value to an adder 810, such that the first and second weighting coefficient multipliers 816 provide a weighted correlation value to the first adder 810 and the subsequent weighting coefficient multipliers 816 provides their weighted correlation values to separate subsequent adders 810. The first adder 810 combines the first and second weighted correlation values, and provides the sum to the second adder 810. Each subsequent adder 810, except for the last, receives a sum from the previous adder 810, combines the sum with a weighted correlation value, and provides a new sum to the next adder 810. The last adder 810 combines the sum from the previous adder 810 and the last weighted correlation value, and outputs a combined weighted correlation value. Square calculator 812 receives combined weighted correlation signal C[n], comprising the combined weighted correlation values, and calculates the square of each combined weighted correlation value to generate squared combined weighted correlation signal $\|C[n]\|^2$. Max operator 814 receives the output of square calculator 812, determines the peak (i.e., maximum) value of the output of square calculator 812 for each cyclic prefix, and outputs a timing-offset estimate θ for each cyclic prefix based on the peak value. Note that, similar to timing-offset estimator 500 of FIG. 5, the use of square calculator 812 is optional and a timing-offset estimate θ may be determined for each cyclic prefix based on the peak value of the real part of the combined weighted correlation values C[n].

Note that, in timing-offset estimator 800, the number of weighting coefficients and the magnitude of the weighting coefficients are selected to compensate for the flattening and migration of the peak values. According to one method, the channel delay profile may be used to select the optimal number and magnitudes of the weighting coefficients for a particular period in time. However, the channel delay profile may vary with movement of the transmitter or receiver and is typically not known by the receiver when the timing of the signal is established. According to the present invention, the flattening and shifting of the peak values may be mitigated by using a triangular weighting scheme in which the magnitudes of the weighting coefficients increase from the beginning of the tapped-delay line, peak at the middle of the tapped-delay line, and decrease to the end of the tapped-delay line as illustrated in FIG. 9.

Figure 9:
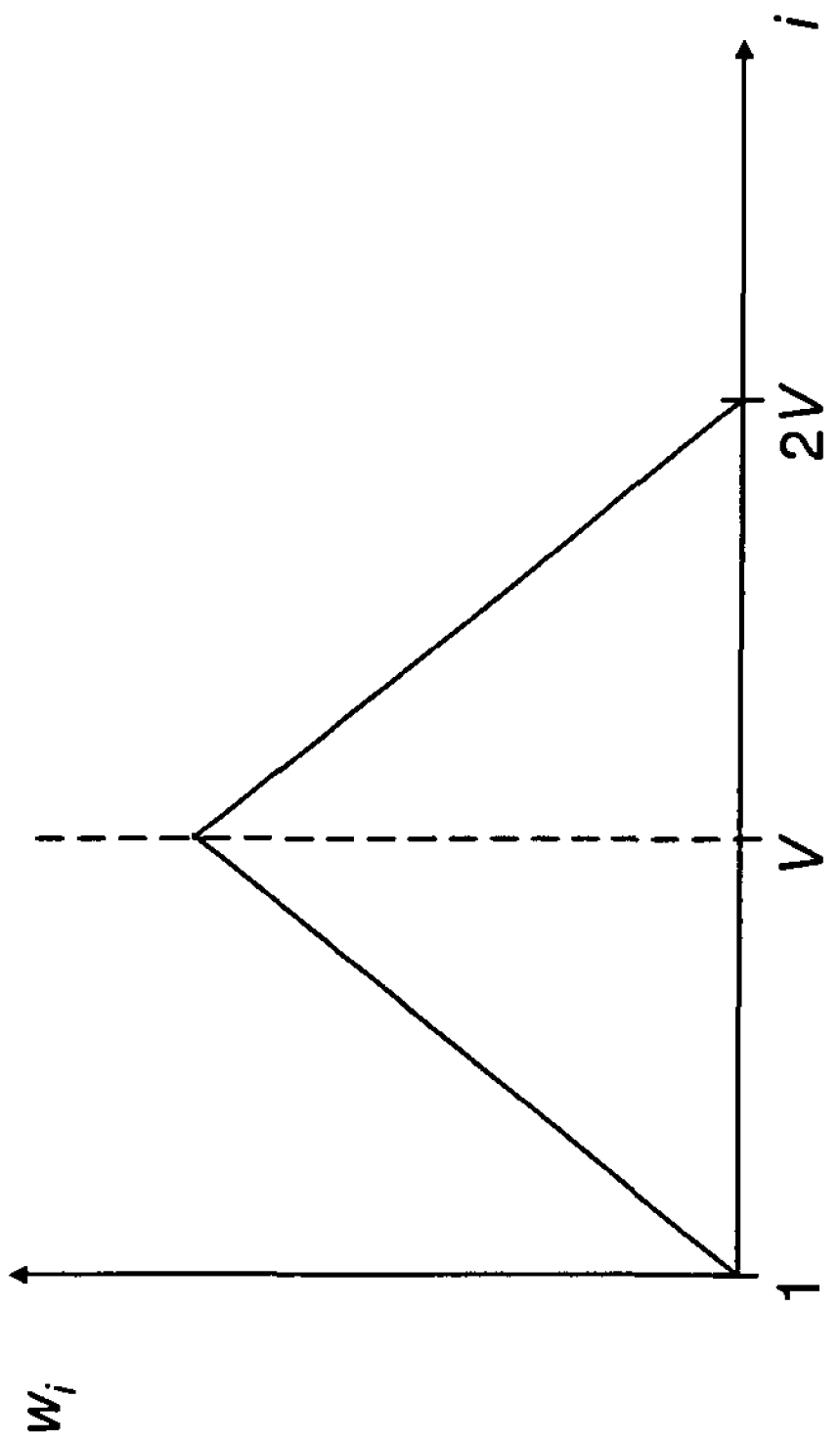
FIG. 9 graphically illustrates a coefficient scheme that may be used with the timing-offset estimator of FIG. 8 according to one embodiment of the present invention.

FIG. 9 graphically illustrates a coefficient scheme that may be used with timing-offset estimator 800 according to one embodiment of the present invention. In FIG. 9, the number of weighting coefficients is equal to twice the number V of samples in the cyclic prefix (i.e., 2V), and the weighting coefficients $w_i$ peak at the $V^{th}$ coefficient $w_V$. The value of the $V^{th}$ coefficient $w_V$ depends on the particular implementation. For example, in an exemplary normalized coefficient scheme, the value of the $V^{th}$ coefficient $w_V$ will be 1.

The weighting coefficients $w_i$ may be calculated using any of a number of different approaches. For example, according to one approach, the first V weighting coefficients $w_i$ may be calculated by dividing the product of the coefficient index number i and the $V^{th}$ coefficient $w_V$ by V (e.g., $w_1=w_V/V$, $w_2=2w_V/V, \ldots, w_V=Vw_V/V$). The sizes of the second V weighting coefficients $w_i$ may be calculated by subtracting the coefficient index number i from 2V, multiplying the difference by the $V^{th}$ coefficient $w_V$, and dividing by V (e.g., $w_{V+1}=(2V-(V+1))w_V/V$, $w_{V+2}=(2V-(V+2))w_V/V, \ldots, w_{2V}=(2V-2V)w_V/V$). This scheme may be used for various channels having different delay characteristics, and may also be used for channels in which the delay characteristics of the channel change due to factors such as movement of the transmitter or receiver. Further, according to other embodiments of the present invention, this scheme may be implemented using recursive processing as shown in FIG. 10.

Figure 10:
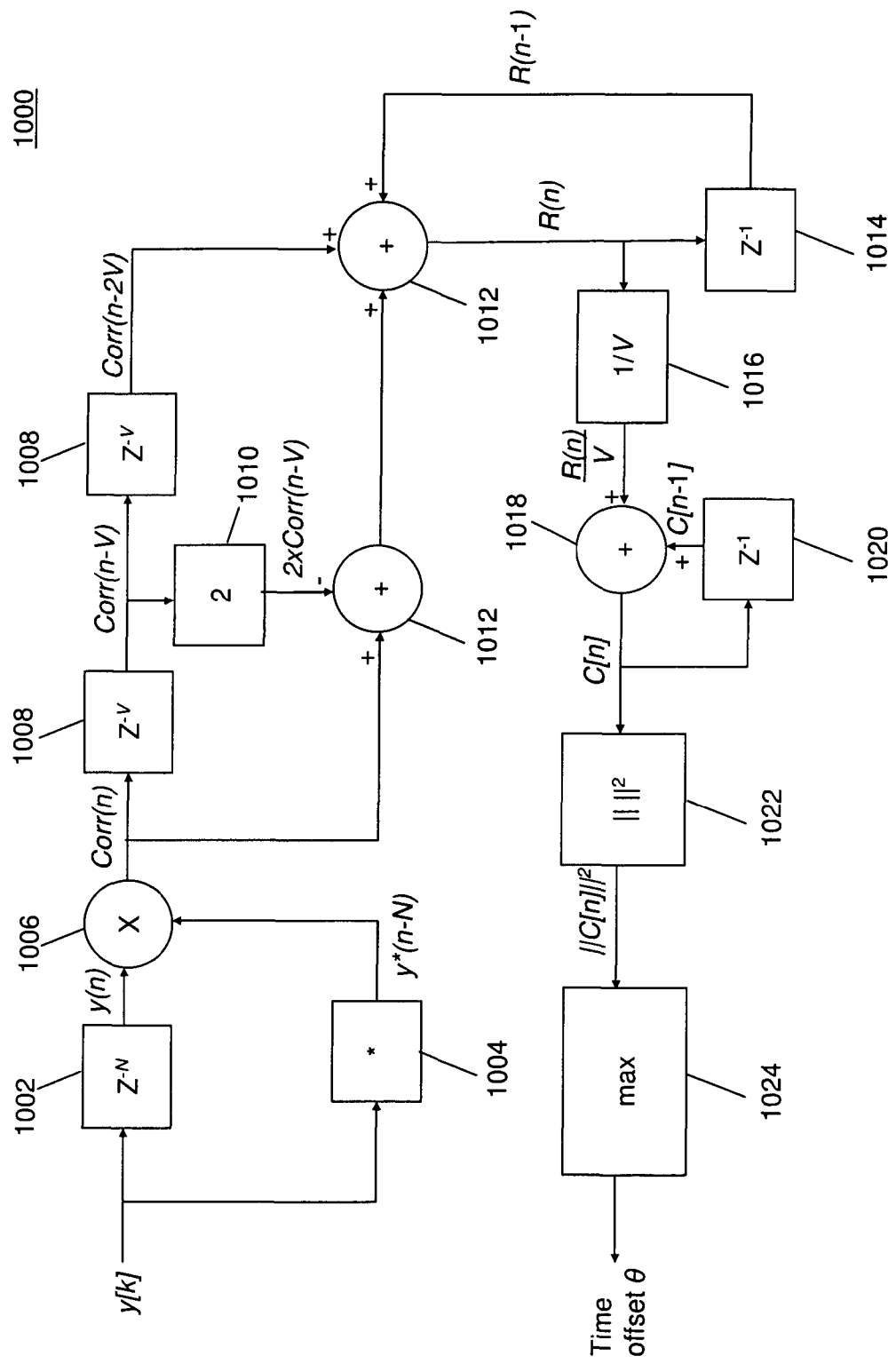
FIG. 10 shows a simplified block diagram of a recursive timing-offset estimator according to one embodiment of the present invention.

FIG. 10 shows a simplified block diagram of a recursive timing-offset estimator 1000 according to one embodiment of the present invention. Recursive timing-offset estimator 1000 has delay element 1002, complex conjugate operator 1004, and multiplier 1006, which together form a correlator, and which perform operations analogous to those of the equivalent processing of timing-offset estimator 500 of FIG. 5 to generate an individual correlation value corr(n) for each received sample. Each individual correlation value corr(n) is then provided to a correlation combiner, which comprises a tapped-delay line, two one sample delay elements 1014 and 1020, a divider 1016, and an adder 1018.

During each iteration, the tapped-delay line, comprising two V sample delay elements 1008, a multiplier 1010, and two adders 1012, processes three individual correlation values. Specifically, the most recently received individual correlation value corr(n) is provided to the first delay element 1008 and the first adder 1012. The first delay element 1008 provides a first delayed individual correlation value corr(n−V) to a second delay element 1008 and a multiplier 1010. Multiplier 1010 multiplies the first delayed individual correlation value corr(n−V) by two and provides the product 2corr(n−V) to first adder 1012. First adder 1012 subtracts the product 2corr(n−V) from the most recently received individual correlation value corr(n) and provides a first sum to the second adder 1012. The second delay element 1008 provides a second delayed individual correlation value corr(n−2V) to the second adder 1012, where it is combined with the first sum and the output of second adder 1012 from the previous iteration R(n−1) that is delayed by delay element 1014 to generate a new output value R(n) as shown in Equation (1):

$$R(n)=R(n-1)+\text{corr}(n)+\text{corr}(n-2V)-2\text{corr}(n-V) \qquad (1)$$

The new output value R(n) is then provided to delay element 1014 for use in the next iteration and to divider 1016.

Divider 1016 divides the new output value R(n) by V and provides the quotient R(n)/V to adder 1018. The quotient R(n)/V is added to the output of adder 1018 from the previous iteration C[n−1] received from delay element 1020 to generate a combined weighted correlation value C[n] for the current iteration as shown in Equation (2) below:

$$C[n] = C[n-1] + \frac{R(n)}{V} \qquad (2)$$

The combined weighted correlation value C[n] is provided to delay element 1020 for use in the next iteration and to square calculator 1022. Square calculator 1022 calculates the square of the combined weighted correlation value C[n] and outputs the result (i.e., $\|C[n]\|^2$) to max operator 1024. This process is repeated to generate a stream of squared combined weighted correlation values $\|C[n]\|^2$. Max operator 1024 receives the stream of squared combined weighted correlation values $\|C[n]\|^2$, determines the peak (i.e., maximum) value for each cyclic prefix, and outputs a timing-offset estimate θ for each cyclic prefix based on the peak value. Note that, similar to timing-offset estimator 500 of FIG. 5, the use of square calculator 1022 is optional and a timing-offset estimate θ may be determined for each cyclic prefix based on the peak value of the real part of the combined weighted correlation values C[n].

As described above, in mobile communication systems, the timing of a signal may change with movement of the mobile device or with variations in the environment. The present invention may be adapted to accommodate such movement or variations. For example, instead of using the latest output of adder 810 of timing-offset estimator 800 of FIG. 8 or the latest output of adder 1018 of timing-offset estimator 1000 of FIG. 10 (i.e., C[n]) to generate timing-offset estimates θ, the outputs can be averaged to track changes in timing. According to one implementation, C[n] can be averaged as shown in Equation (1) below:

$$C'[n]=\alpha C'[n-(N+V)]+(1-\alpha)C[n] \qquad (1)$$

where C'[n] is the updated value of C[n] for the current iteration and α is a weighting factor with a value between 0 and 1. C'[n−(N+V)] is the updated value of C[n] corresponding to sample n−(N+V), where n is the index of the current sample, N is the number of samples in an OFDM symbol, and V is the number of samples in a cyclic prefix. Note that the weighting factor α may be changed based on tracking conditions. Specifically, larger values of weighting factor α may be used to reduce the noise in the received signal; however, larger values reduce the tracking ability. Smaller values of weighting factor α may be used to improve tracking ability; however, smaller values introduce more noise into the estimation.

Figure 11:
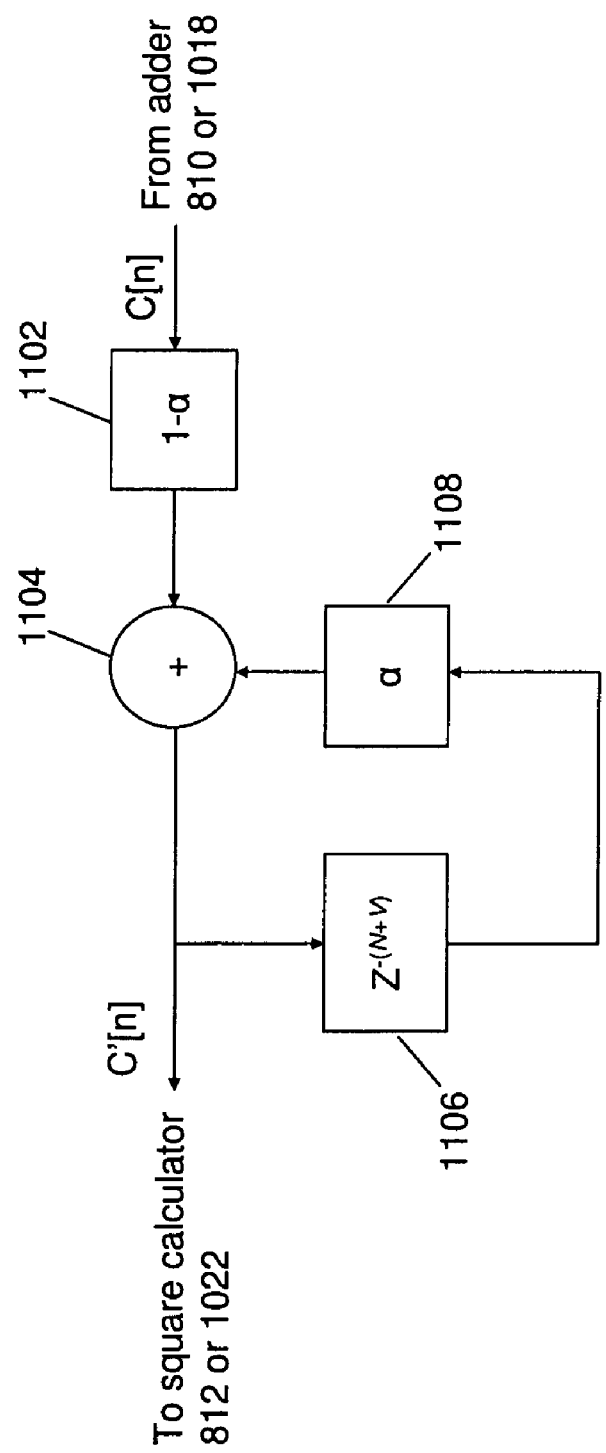
FIG. 11 shows a simplified block diagram of a weighted averager for tracking changes in timing according to one embodiment of the present invention.

FIG. 11 shows a simplified block diagram of a weighted averager 1100 for tracking changes in timing according to one embodiment of the present invention. Weighted averager 1100 may be implemented in combination with timing-offset estimator 800 or 1000. Weighted averager 1100 has multiplier 1102 that receives the most recent value of signal C[n] from adder 810 or 1018, multiplies the most recent value by 1−α, and provides the resulting product to adder 1104. An updated value of signal C[n] that is delayed by N+V samples by delay element 1106 is multiplied by α by multiplier 1108 and provided to adder 1104. The delayed updated value of signal C[n] and the product from adder 1104 are combined to generate a value of updated signal C'[n]. The updated value is then provided to delay element 1106 for a subsequent iteration and to square calculator 812 or 1022.

While the present invention has been described relative to its use with OFDM, the present invention is not so limited. The present invention may be used with other multi-carrier modulated signals, such as coded orthogonal frequency division multiplexed signals (COFDM), and single-carrier modulated signals that employ a cyclic prefix.

According to certain embodiments of the present invention, a combined weighted correlation value may be said to "correspond to" a combination of a set of weighted correlation values. For example, in the embodiment of FIG. 8, combined weighted correlation value c[n] "corresponds to" a combination of a set of weighted correlation values, where each individual correlation value corr(n) in a set of individual correlation values is multiplied by a corresponding weighting coefficent $w_i$, and the weighted correlation values are combined to generate the combined weighted correlation value.

Similarly, according to certain embodiments of the present invention, a set of weighted correlation values may be said to "correspond to" a set of weighting coefficients applied to a set of the individual correlation values. For example, in the embodiment of FIG. 8, the outputs from multipliers 816 "corresponds to" a set of weighted correlation values generated by applying a set of weighting coefficients $w_i$ to a set of individual correlation values corr(n).

In the exemplary recursive embodiment of FIG. 10, combined weighted correlation value C[n] may be said to "correspond to" a combination of a set of weighted correlation values, and the set of weighted correlation values may be said to "correspond to" a set of weighting coefficients applied to a set of the individual correlation values, where the recursive processing of FIG. 10 generates a combined weighted correlation value equivalent to that generated using the non-recursive processing of FIG. 8, even though, in the recursive processing, weighted correlation values might not actually be generated and combined to produce the combined weighted correlation values.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

We claim:

1. A method for processing a modulated signal having a cyclic prefix, the method comprising:
    (a) generating, by a timing-offset estimator, individual correlation values for the modulated signal;
    (b) generating a stream of combined weighted correlation values from the individual correlation values, wherein:
        each combined weighted correlation value corresponds to a combination of a different set of weighted correlation values;
        each set of weighted correlation values corresponds to a set of weights applied to a different set of the individual correlation values;
        the weights in a first subset of the set of weights ascend linearly from a first minimum value to a peak value; and
        the weights in a second subset of the set of weights descend linearly from the peak value to a second minimum;
    (c) identifying a peak value based on the stream of combined correlation values; and
    (d) generating a timing-offset estimate corresponding to the cyclic prefix based on the identified peak value.

2. The invention of claim 1, wherein the modulated signal is an Orthogonal Frequency Division Multiplexing (OFDM) signal.

3. The invention of claim 1, wherein the cyclic prefix has V samples, and the set of weights has 2V weights, wherein V is an integer.

4. The invention of claim 3, wherein:
    each weight in the set of 2V weights is assigned, in ascending order, a corresponding positive integer index number;
    the first subset of weights has V weights, wherein each weight in the first subset is proportional to the corresponding index number of the weight divided by V; and
    the second subset of weights has V weights, wherein each weight in the second subset is proportional to (i) the difference between 2V and the corresponding index number of the weight divided by (ii) V.

5. The invention of claim 1, wherein the method is implemented using recursive processing.

6. The invention of claim 5, wherein:
    each correlation value corr(n) is proportional to y(n)y*(n−N); and
    each combined weighted correlation value C[n] is proportional to $$C[n-1] + \frac{R(n)}{V};$$

wherein:
    n is a sample index of the modulated signal y(n) and n is an integer;
    y*(n−N) is a complex conjugate value corresponding to a sample of modulated signal y(n) delayed by N samples;
    N is a length in samples of an OFDM symbol and N is an integer;
    C[n−1] is a combined weighted correlation value corresponding to an n−1$^{th}$ sample of modulated signal y(n);
    V is a length in samples of a cyclic prefix; and
    R(n) is proportional to R(n−1i)+corr(n)+corr(n−2V)−2corr(n−V); wherein:
        R(n−1) is a value of R(n) corresponding to an n−1$^{th}$ sample of modulated signal y(n);
        corr(n−2V) is an individual correlation value delayed by 2V samples; and
        2corr(n−V) is twice the value of an individual correlation value delayed by V samples.

7. The invention of claim 1, wherein:
    step (c) further comprises applying weighted averaging to the stream of combined correlation values to generate a stream of averaged combined correlation values; and
    step (d) comprises identifying the peak value in the stream of weighted combined correlation values.

8. The invention of claim 7, wherein the weighted averaging is applied to a combined correlation value for a current sample of a current OFDM symbol and an averaged combined correlation value for a corresponding sample of a previous OFDM symbol.

9. An apparatus for processing a modulated signal having a cyclic prefix, the apparatus comprising a timing-offset estimator comprising:
(a) means for generating individual correlation values for the modulated signal;
(b) means for generating a stream of combined weighted correlation values from the individual correlation values, wherein:
each combined weighted correlation value corresponds to a combination of a different set of weighted correlation values;
each set of weighted correlation values corresponds to a set of weights applied to a different set of the individual correlation values;
the weights in a first subset of the set of weights ascend linearly from a first minimum value to a peak value; and
the weights in a second subset of the set of weights descend linearly from the peak value to a second minimum;
(c) means for identifying a peak value based on the stream of combined correlation values; and
(d) means for generating a timing-offset estimate corresponding to the cyclic prefix based on the identified peak value.

10. The invention of claim 9, wherein the modulated signal is an Orthogonal Frequency Division Multiplexing (OFDM) signal.

11. The invention of claim 9, wherein the cyclic prefix has V samples, and the set of weights has 2V weights, wherein V is an integer.

12. The invention of claim 11, wherein:
each weight in the set of 2V weights is assigned, in ascending order, a corresponding positive integer index number;
the first subset of weights has V weights, wherein each weight in the first subset is proportional to the corresponding index number of the weight divided by V; and
the second subset of weights has V weights, wherein each weight in the second subset is proportional to (i) the difference between 2V and the corresponding index number of the weight divided by (ii) V.

13. The invention of claim 9, wherein the apparatus is implemented using recursive processing.

14. The invention of claim 13, wherein:
each correlation value corr(n) is proportional to $y(n)y^*(n-N)$; and
each combined weighted correlation value C[n] is proportional to $$C[n-1] + \frac{R(n)}{V};$$

wherein:
n is a sample index of the modulated signal y(n) and n is an integer;
$y^*(n-N)$ is a complex conjugate value corresponding to a sample of modulated signal y(n) delayed by N samples;
N is a length in samples of an OFDM symbol and N is an integer;
C[n−1] is a combined weighted correlation value corresponding to an $n-1^{th}$ sample of modulated signal y(n);
V is a length in samples of a cyclic prefix; and
R(n) is proportional to R(n−1)+corr(n)+corr(n−2V)−2corr(n−V); wherein:
R(n−1) is a value of R(n) corresponding to an $n-1^{th}$ sample of modulated signal y(n);
corr(n−2V) is an individual correlation value delayed by 2V samples; and
2corr(n−V) is twice the value of an individual correlation value delayed by V samples.

15. An apparatus for processing a modulated signal having a cyclic prefix, the apparatus comprising a timing-offset estimator, which comprises:
a correlator adapted to generate individual correlation values for the modulated signal;
a combiner adapted to generate a stream of combined weighted correlation values from the individual correlation values, wherein:
each combined weighted correlation value corresponds to a combination of a different set of weighted correlation values;
each set of weighted correlation values corresponds to a set of weights applied to a different set of the individual correlation values;
the weights in a first subset of the set of weights ascend linearly from a first minimum value to a peak value; and
the weights in a second subset of the set of weights descend linearly from the peak value to a second minimum; and
a maximum operator adapted to:
identify a peak value based on the stream of combined correlation values; and
generate a timing-offset estimate corresponding to the cyclic prefix based on the identified peak value.

16. The invention of claim 9, wherein:
the maximum operator applies weighted averaging to the stream of combined correlation values to generate a stream of averaged combined correlation values; and
the maximum operator identifies the peak value in the stream of weighted combined correlation values.

17. The invention of claim 16, wherein the weighted averaging is applied to a combined correlation value for a current sample of a current OFDM symbol and an averaged combined correlation value for a corresponding sample of a previous OFDM symbol.

* * * * *

UNITED STATES PATENT AND TRADEMARK OFFICE
CERTIFICATE OF CORRECTION

PATENT NO.       : 7,809,046 B2
APPLICATION NO.  : 11/866812
DATED            : October 5, 2010
INVENTOR(S)      : Syed Mujtaba and Xiaowen Wang Page 1 of 1

It is certified that error appears in the above-identified patent and that said Letters Patent is hereby corrected as shown below:

In column 12, line 53, replace "R(n-1i)" with --R($n$-1)--.

Signed and Sealed this
Fourth Day of January, 2011

David J. Kappos
*Director of the United States Patent and Trademark Office*